United States Patent [19]

Czellér et al.

[11] Patent Number: 4,647,375
[45] Date of Patent: Mar. 3, 1987

[54] APPARATUS FOR UNIVERSAL WATER TREATMENT

[76] Inventors: Béla Czellér, Május 1. u. 5., H-2400 Dunaujváros; János Kozák, Móra F. u. 13., 6600 Szentes; Gábor Kucsera, Tanácsköztársaság ut 13., H-6600 Szentes; József Nádudvari, Koszta J. u. 10., H-6600 Szentes; Ferenc Nagyistók, Kiss E. u. 7., H-6600 Szentes, all of Hungary

[21] Appl. No.: 782,616
[22] PCT Filed: Jun. 10, 1983
[86] PCT No.: PCT/HU83/00033
 § 371 Date: Jan. 30, 1984
 § 102(e) Date: Jan. 30, 1984
[87] PCT Pub. No.: WO83/04377
 PCT Pub. Date: Dec. 22, 1983

Related U.S. Application Data

[63] Continuation of Ser. No. 584,942, Jan. 30, 1984, abandoned.

[30] Foreign Application Priority Data

Jun. 11, 1983 [HU] Hungary ............................ 1895/82

[51] Int. Cl.⁴ ............................................. B01D 33/16
[52] U.S. Cl. .................................... 210/267; 210/274; 210/275; 210/284
[58] Field of Search ............... 210/265, 267, 274, 275, 210/284, 402, 411, 412

[56] References Cited

U.S. PATENT DOCUMENTS

| 3,680,701 | 8/1972 | Holca | 210/274 |
| 3,879,294 | 4/1975 | Ellis et al. | 210/354 |
| 4,021,339 | 5/1977 | Foody | 210/275 |
| 4,093,552 | 6/1978 | Guyer | 210/297 |

Primary Examiner—Ivars Cintins
Attorney, Agent, or Firm—Handal & Morofsky

[57] ABSTRACT

An apparatus for universal water treatment with cylindrical housing and rotating ring-baskets, in which the housing is provided with untreated water inlet and purified water outlet stubs and the rotating filter baskets contains a back-washing chamber for regeneration of the baskets. The rotary filter baskets contain also an annular coagulating space formed in the cylindrical housing connected to the untreated water inlet stub. The rotating filter baskets are arranged uniaxially with the coagulation space and with each other. The filter baskets may be arranged within or above each other. Several filter beds are arranged in the filter baskets separated from each other and provided with independent back-washing chamber. The filter beds are arranged between cylindrical, perforated partition walls.

10 Claims, 3 Drawing Figures

4,647,375

APPARATUS FOR UNIVERSAL WATER TREATMENT

This application is a continuation of application Ser. No. 584,942, filed Jan. 30, 1984 now abandoned.

FIELD AND BACKGROUND OF THE INVENTION

The invention relates to an apparatus for universal water treatment with cylindrical housing and rotating ring-basket, in which the housing is provided with untreated water inlet and purified water outlet stubs and the rotating filter basket contains back washing chamber, wherein said apparatus is continuously regenerated.

It is well-known that the substances floating in the water are removed during the filtering process. For this purpose traditionally sand filters have been used, the operation of which is essentially similar to the filtration taking place in the nature. However the fine grained layer in the water filters become polluted after a while, thus its regeneration is necessary.

The regeneration is carried out with clean water in counterflow to the filtration and during this process in given case the filter bed is loosened with air, or other gaseous medium.

The regeneration can be carried out only by interruption of the filtering process. Accordingly continuous filtration can be carried out only by use of several separate filtering apparatuses and during regeneration of one of the filtering apparatuses the filtration is carried out with the other or several other apparatuses.

However the generally decreasing filtering rate caused by pollution, and the thereby diminishing specific throughput require fairly large size filtering apparatuses, which will considerably increase the cost of filtering process.

Further difficulty is caused by the fact, that in order to increase the filtering efficiency, several filter beds are used whenever necessary. Furtuermore, in order to meet the different water treatment requirements, in addition to the removal of the floating solid impurities, chemical filtration too, such as acid-, gas-, iron-, nitrogen- and/or phosphorus-, heavy metal, salt-extraction, deodorization, etc. may be carried out as well. In this way, the simple filtering process is combined generally with other water treatment processes, which however necessitate the coonstruction of further filtering and treating vessels, which increase the cost of the already expensive intermittently operating filtering technology, Moreover the technology itself too becomes very complicated, since in order to ensure the intermittent operation, several coagulating or chemical-conditioning tanks, furthermore filters of different filter materials and grain size are necessary.

In order to reduce the above difficulties, filtering apparatuses were constructed for continuous purification. Known is for instance such apparatus fitted with wire spool, in which slowly rotating nozzle is used for washing over the filter element.

Another system comprises a scraper fitted into the gaps between the filter discs, combing out the accumulated impurities.

In continuously operating filter apparatuses, the separated impurity passes into a collecting space, from where it is periodically removed.

The disadvantage of above solutions lies first of all in that the extent of filtration is restricted by the gap size of the wire spools and filter discs.

Similar is the operation of the filter apparatuses fitted with continuously regenerating sieve cloth, or with different porous materials. Known are also fitter apparatuses provided with replaceable filter inserts and cartridges.

Such continuously flushing water filtering apparatus also exists, which has a cylindrical housing with rotating filter basket carried on sealed bearing and provided with untreated water inlet stub in the centre of the housing as well as purified water outlet stub reaching into the bottom part of the housing, the filter basket is closed on the top sealed and fitting into the hole of the outlet stub. The jacket of the filter basked is fitted with filter elements, while a cavity is formed on the inner wall of the housing fitting to the filter basket along a plane perpendicular to the inlet and outlet stubs, and the outlet hole passing through the wall of the housing is leading into the cavity. Such apparatuses are described in the Hungarian Pat. No. 172 006. Accordingly the filter elements are prisms retaining the filter medium, the prisms are formed by plate the two opposite sides of which are perforated, or by sieve cloth, which prisms have a mounting flange fitting to the filter basket. In a preferred embodiment the outer side of the filter basket is curved according to the radius of the filter basket. The filter medium in the filter basket mey be sand, crushed quartz, active carbon, crushed porcelain fragments or their optional mixture.

This apparatus ensures the filtering of the floating solids of the water, which has a small size, low cost of production and continuous operation, but it does not allow the simultaneous use of the filter elements of different quality and chemical filtration, thus it gives water purity corresponding only to industrial water quality.

SUMMARY OF THE INVENTION

The object of the present invention is an apparatus for universal water treatment, which ensures highly efficient purification of the drinking water, bath water or waste water as required with the combination of different water treatment and filtering processes, at the same time its size is small, the cost of production is low and it fulfils the special water treatment requirements.

According to the present invention in the water treatment apparatus with cylindrical housing and rotating filter basket, the housing is provided with untreated water inlet stub and purified water outlet stub, while the rotary filter basket contains at least one back-washing chamber, an anular coagulating space was formed in the cylindrical housing connected to the untreated water inlet stub, and several rotating filter baskets are used arranged uniaxially with the coagulation space and with each other in addition the apparatus is provided with at least one gas inlet pipe.

The filter baskets used in the apparatus according to the invention may be arranged within or above each other. Several filter beds are arranged in the filter baskets suitably separated from each other and provided with independent back-washing chamber, in which the filter beds are arranged preferably between cylindrical, perforated partition walls.

The applied filter beds may be made of fractions of the same material but with different grain size, or fractions of different materials with different grain size.

Generally it is suitable to use quartz, hydroanthracite, active carbon, zeolite, fermago-magno, synthetic resin or ceramic fragments, or their mixture in optional proportion.

In the apparatus according to the invention the gas conducting pipe or one those is leading into the flushing chamber and/or coagulation space, in order to facilitate or to carry out the chemical treatment and/or the regeneration of the filter bed with air and/or gas.

The flushing chamber or chambers are inter connected suitably with the last filter unit in order to carry out the back-washing with the filtered water.

The water treatment and regeneration can be continuously carried out in the so-formed apparatus, the operation of which requires minimal energy and little flushing water. Size of the apparatus is extremely small, and it can be constructed in different sizes according to the requirements.

BRIEF DESCRIPTION OF THE DRAWINGS

Further details of the invention are described by way of examples with the aid of drawing, wherein.

DESCRIPTION OF THE PREFERRED EMBODIMENTS

Figure 1:
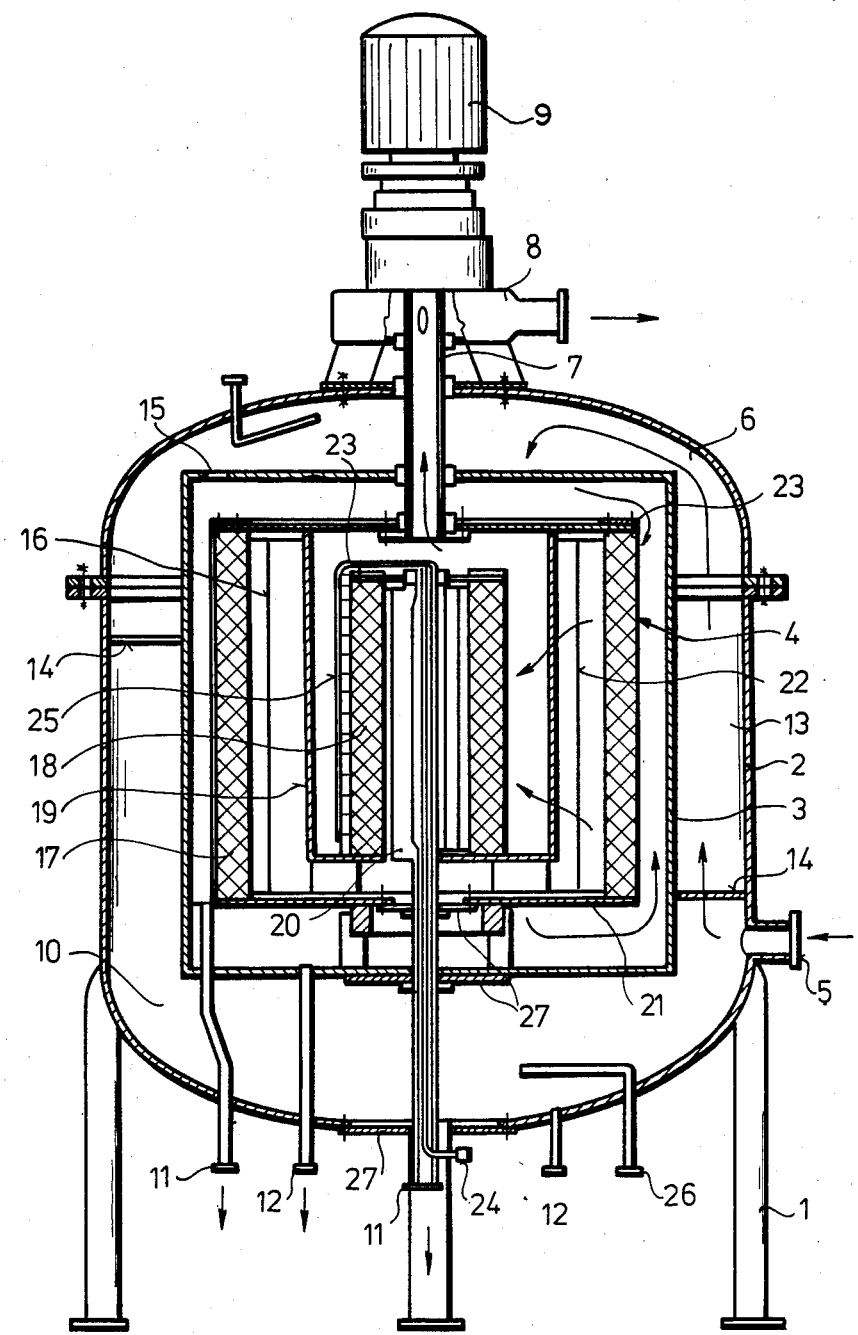
FIG. 1 is a section of the apparatus according to the invention, where the filter baskets are arranged within each other.

The apparatus shown in FIG. 1 consists of cylindrical tank 2 standing on legs 1, within which a filter housing 3 is arranged. The filter basket 4 is rotatably supported in the filter housing 3.

Untreated water inlet stub 5 is arranged on the jacket of the cylindrical tank 2, while filtered water outlet stub 8 is fixed to the cover 6 connected to tubular shaft 7 supporting the filter basket 4. The filtered water outlet stub 8 is supported and sealed on the tubular shaft 7, while the driving gear 9 on the top is fixed onto the tubular shaft 7.

Slurry outlets 11 and drain pipe 12 on the bottom are arranged on the bottom plate 10 of the cylindrical tank 2.

An annular coagulation space 13 is formed between the cylindrical tank 2 and filter house 3. Here the water flow is facilitated by baffle plates 14. There are openings 15 on the upper part of the filter housing 3, through which the water flows from the coagulation space 13 into the filter housing 3.

An external back-washing chamber 16 is connected with the internal jacket of the filter housing, from the lower part of which extends one of the slurry water outlet stubs 11.

The filter basket 4 rotatably supported in the filter house 3 includes external filter cylinder 17 and internal filter cylinder 18. The filter cylinders consist of a filter bed arranged between perforated partition walls, with cylindrical baffle plate 19 between them. The slurry can be removed from the back-washing chamber pertaining to the internal filter cylinder 18 through the slurry outlet stub 11 extending through the bottom plate 21 of the filter basket 4.

The external and internal filter cylinders 17 and 18 are divided into radial compartments with plates 22. These compartments contain the said filter material, which is filled in through the openings provided with lockable covers 23 formed on the compartments.

A gas inlet pipe 24 is connected to the internal back-washing chamber 20 through the slurry water outlet stub 11. Nozzles 25 are formed on its end which face the geometrical centerline of the apparatus. Similarly, gas inlet pipe 26 is connected to the coagulation space 13 through the bottom plate 10 of the cylindrical tank 2.

Assembly and maintenance of the apparatus according to the invention are ensured through an acces holes closed by covers 27.

Operation of the apparatus is the following:

The untreated water enters through the untreated water inlet stub 5 into the coagulation space 13, where the admitted chemicals are mixed and conditioned according to the purpose of the water treatment. In given cases, air or other gas too may be mixed with the water, according to the nature of the treatment (deironization, degasing, acid extraction, etc.). Velocity of the water to be treated decreases in the coagulation space, then following the end of the treatment the water uniformly distributed through the openings 15 of the filter housing 3 passes onto the filter cylinder 17 of the filter basket 4, where the floating solid impurities of the water to be treated get caught. The water passing through the filter bed flows along the cylindrical baffle plates 19 into the central part of the filter basket 4, where uniformly distributed again, passes onto the filter bed or filter net arranged on the internal filter cylinder 17, the grain size and/or material of which is different from that of the external filter bed, where the water is purified from the fine impurities. The purified water leaves the filter basket 4 through the tubular shaft 7 and filtered water outlet stub 8.

The filter basket 4 is turned over by driving gear 9 at a rate according to the requirements of the water treatment, thus each compartment of the external and internal filter cylinders 17 and 18 moves along the external and internal back-washing chambers 16 and 20 respectively. Due to the pressure difference, part of the filtered water flows from the interior of the filter basket 4 through the filter bed counter to the direction of filtration and entrains the deposited impurities, which leaves through the slurry outlet stubs 11. More intensive back-washing of the filter beds is facilitated by air or other gas admitted through the gas inlet pipe 24. Similarly, air or other gas can be blown into the coagulation space 13 through the other gas inlet pipe 26 for completion of the water treatment.

Figure 3:
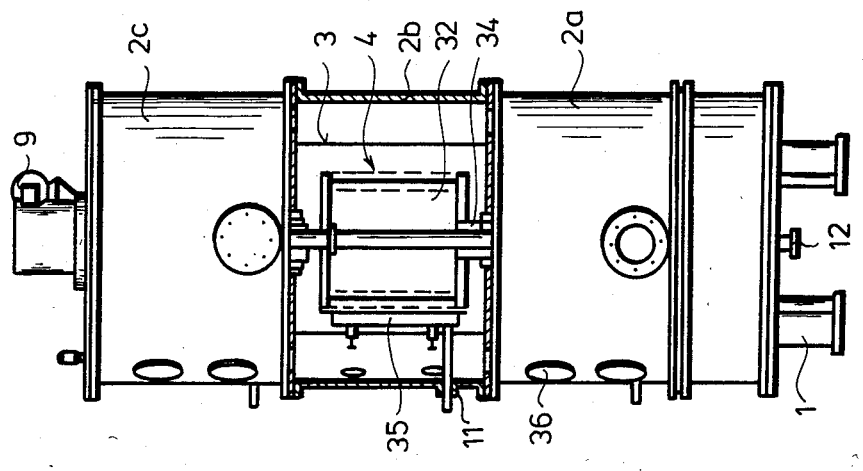
FIG. 3 is a side view of the apparatus shown in FIG. 2 cut away in part.
Figure 2:
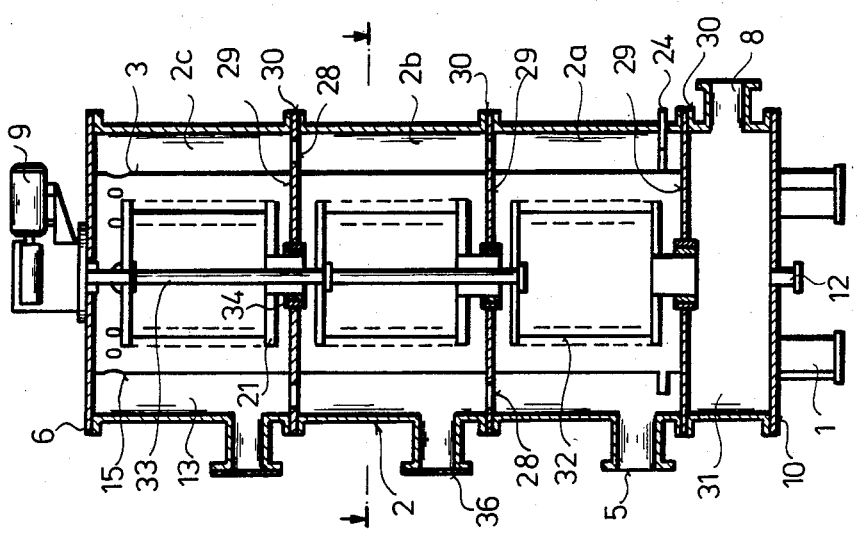
FIG. 2 is another embodiment of the apparatus, where the filter baskets are arranged above each other

Another embodiment of the apparatus according to the invention is shown in FIGS. 2 and 3. Here too, the apparatus stands on legs 1 and is arranged in cylindrical tank 2. The cylindrical tank 2 is formed with units 2a, 2b and 2c interconnected by flanges 30 through partition walls 29 provided with transfer holes 28. The assembled apparatus is closed with cover 6 on the top and bottom plate 10. Filtered water chamber 31 provided with filtered water outlet stub 8 is formed between the bottom plate 10 and unit 2a.

The coagulation space 13 is formed on the external annular part of the cylindrical tank 2, and the filter cylinders 32 are arranged within this space in the filter house 3. The upper part of filter house 3 is provided with transfer holes 15. The filter cylinders 32 are similar to the external filter cylinders 17 shown in FIG. 1.: these too are bodies divided into segments and confined by perforated plates, which include the filter beds. The filter baskets 4 are embedded in central shaft 33 driven by driving gear 9. The outlet stubs are centrally arranged on the bottom plates 21 of the filter baskets 4, embedded as sliding bearings into the partition walls 29.

The filter baskets 4 of the apparatus are provided with back-washing chambers 35 as shown in FIG. 3. These surround the filter baskets 4 preferably at an angle of 25°–30°, their height is the same as that of the filter baskets 4.

The apparatus—similarly to the one shown in FIG. 1,—is provided with untreated water inlet stub 5, filtered water outlet stub 8, slurry outlet and drain pipe 12. The apparatus is also provided with gas inlet pipe.

Operation of the apparatus shown in FIGS. 2 and 3 is the following:

The water to be treated is admitted through the untreated water inlet stub 5 into the coagulation space 13, where the admitted chemicals are mixed and conditioned according to the purpose of the water treatment. The water may be mixed with air or other gasses, when needed.

The water flow slows down in the coagulation space 13, then it passes through the transfer holes 28 into the upper unit 2c and from there through transfer holes 15 into the filtering space. Here passing through the first filter bed ir flows into the central part of the filter basket 3, then through the outlet stub 34 into unit 2b. Following the filtration taking place here, the water flows into the lowermost unit 2a, then into the filtered water chamber 31 and finally it leaves through the filtered water outlet stub 8. Meanwhile the back-washing of the compartments at the back-washing chambers 35 takes place continuously.

Although the apparatus shown in FIGS. 2 and 3 consists of three units only, a number of units may be series connected in accordance with the purpose of the water treatment, in which filter beds of different material and grain size may be optionally combined, as well as the chemicals admitted into the coagulation space. The units are of the same construction, the non-functioning stubs are closed with covers 36 during assembly.

The examples demonstrate that the apparatus according to the invention may be assembled in any optional combination according to the purpose of filtration or treatment: the filter baskets are concentrically arranged within or above each other, while the filter materials are optimally selected and arranged according to the requirements. The apparatus can be continuously operated, its size is small and its output is extremely high compared with the dimensions. Production of the apparatus is inexpensive, its assembly and maintenance are simple.

What we claim is:

1. In an apparatus for water treatment comprising a cylindrical tank and a plurality of rotating filter baskets located in said cylindrical tank, said filter baskets containing a bed of filtering material, and wherein said baskets are continuously regenerated, said tank comprising an inlet stub for the untreated water and an outlet stub for the purified water, wherein an annular coagulation space is formed in the cylindrical tank and said plurality of rotating filter baskets (4) are mounted coaxially with the coagulation space and with each other, back-washing means formed in said filter basket, a water inlet stub formed in said tank for the untreated water, conduit means for selectively returning a portion of the untreated water into said back-washing means separating said filter baskets, and further comprising at least one gas inlet pipe.

2. The combination as claimed in claim 1, wherein the filter baskets are arranged within each other.

3. The combination as claimed in claim 1, wherein the filter baskets are arranged above each other.

4. The combination as claimed in claim 1, wherein said back-washing means comprise a plurality of independent, separate back-washing chambers located in the filter baskets.

5. The combination as claimed in claim 4, characterized in that the filter baskets consist of filter beds arranged between perforated partition walls.

6. The combination as claimed in claim 5, chaaracterized in that the filter beds are made of fractions of different grain size of the same material.

7. The combination as claimed in claim 5, characterized in that the filter beds are made of fractions of different grain size of different materials.

8. The combination as claimed in claim 5, characterized in that the filter beds comprise a mixture of quartz, active carbon, zeolite synthetic resin or ceramic fragments.

9. The combination as claimed in claim 4, characterized in that said gas inlet pipe is led into the back-washing chamber s or coagulation space.

10. The combination as claimed in claim 1, characterized in that the outlet stub of the back-washing means is led into a filter centrally located within said filter baskets.

* * * * *